(12) United States Patent
Nguyen et al.

(10) Patent No.: US 6,772,307 B1
(45) Date of Patent: Aug. 3, 2004

(54) FIRMWARE MEMORY HAVING MULTIPLE PROTECTED BLOCKS

(75) Inventors: Tom Long Nguyen, Olympia, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 09/879,333

(22) Filed: Jun. 11, 2001

(51) Int. Cl.⁷ .............................................. G06F 13/00
(52) U.S. Cl. ...................... 711/163; 711/103; 711/152; 711/170
(58) Field of Search ................................ 711/163, 103, 711/170

(56) References Cited

U.S. PATENT DOCUMENTS

| | | |
|---|---|---|
| 5,065,364 A | 11/1991 | Atwood et al. |
| 5,126,808 A | 6/1992 | Montalvo et al. |
| 5,197,034 A | 3/1993 | Fandrich et al. |
| 5,210,845 A | 5/1993 | Crawford et al. |
| 5,293,424 A | 3/1994 | Holtey et al. |
| 5,297,148 A | 3/1994 | Harari et al. |
| 5,369,754 A | 11/1994 | Fandrich et al. |
| 5,438,546 A | 8/1995 | Ishac et al. |
| 5,442,704 A | 8/1995 | Holtey |
| 5,509,134 A | 4/1996 | Fandrich et al. |
| 5,513,136 A | 4/1996 | Fandrich et al. |
| 5,592,641 A | 1/1997 | Fandrich et al. |
| 5,673,222 A | 9/1997 | Fukumoto |
| 5,704,035 A | 12/1997 | Shipman |
| 5,822,251 A | 10/1998 | Bruce et al. |
| 5,844,986 A | 12/1998 | Davis |
| 5,886,582 A | 3/1999 | Stansell |
| 5,890,191 A | 3/1999 | Espinor et al. |
| 5,954,818 A | 9/1999 | Dalvi |
| 5,974,500 A | 10/1999 | Maletsky |
| 5,991,197 A | 11/1999 | Ogura |
| 6,009,495 A | 12/1999 | DeRoo et al. |
| 6,026,016 A * | 2/2000 | Gafken .................. 365/185.04 |
| 6,031,757 A | 2/2000 | Chuang et al. |
| 6,058,048 A | 5/2000 | Kwon |
| 6,081,664 A | 6/2000 | Nowlin, Jr. |
| 6,154,819 A | 11/2000 | Larsen |
| 6,154,837 A | 11/2000 | Fudeyasu et al. |
| 6,182,187 B1 | 1/2001 | Cox et al. |
| 6,205,548 B1 | 3/2001 | Hasbun |
| 6,209,069 B1 | 3/2001 | Baltar |
| 6,240,519 B1 * | 5/2001 | James et al. ................. 713/202 |
| 6,330,635 B1 * | 12/2001 | Stafford ...................... 711/103 |
| 6,377,486 B1 * | 4/2002 | Lee ....................... 365/185.11 |
| 6,446,179 B2 * | 9/2002 | Baltar ......................... 711/163 |
| 6,591,328 B1 * | 7/2003 | Iida et al. .................... 711/103 |
| 6,633,964 B2 * | 10/2003 | Zimmer et al. ............. 711/163 |
| 2002/0144050 A1 * | 10/2002 | Zimmer et al. ............. 711/103 |

OTHER PUBLICATIONS

Intel 82802AB/82802AC Firmware Hub (FWH), Datasheet, Intel Corp., May 1999, 44 pages.

International Search Report in connection with Int'l Application PCT/US99/09462 (8 pages).

"How Cellular Pirates Have Thwarted Efforts To Outsmart Them," by G. Naik, Wall Street Journal, p. B1, Mar. 16, 1995.

"Cellular Carriers Try New Tricks to Beat Bandits," G. Naik, Wall Street Journal, p. B1, Mar. 16, 1995.

* cited by examiner

Primary Examiner—Reba I. Elmore
(74) Attorney, Agent, or Firm—Blakely, Sokoloff, Taylor & Zafman LLP (57) ABSTRACT

A BIOS memory including multiple memory blocks, with two or more memory blocks of the multiple memory blocks configured to store boot code.

11 Claims, 8 Drawing Sheets

| BLOCK-PROTECTION CONFIGURATIONS | BL HARDWARE PROTECTION BLOCKS<br>_BLOCK LOCK_ | WP HARDWARE PROTECTION BLOCKS |
| --- | --- | --- |
| 1 | BLOCK 15 BY DEFAULT | BLOCKS 0 THROUGH 14 |
| 2 | BLOCKS 14 THROUGH 15 | BLOCKS 0 THROUGH 13 |
| 3 | BLOCKS 13 THROUGH 15 | BLOCKS 0 THROUGH 12 |
| 4 | BLOCKS 12 THROUGH 15 | BLOCKS 0 THROUGH 11 |
| 5 | BLOCKS 11 THROUGH 15 | BLOCKS 0 THROUGH 10 |
| 6 | BLOCKS 10 THROUGH 15 | BLOCKS 0 THROUGH 9 |
| 7 | BLOCKS 9 THROUGH 15 | BLOCKS 0 THROUGH 8 |
| 8 | BLOCKS 8 THROUGH 15 | BLOCKS 0 THROUGH 7 |
| 9 | BLOCKS 7 THROUGH 15 | BLOCKS 0 THROUGH 6 |
| 10 | BLOCKS 6 THROUGH 15 | BLOCKS 0 THROUGH 5 |
| 11 | BLOCKS 5 THROUGH 15 | BLOCKS 0 THROUGH 4 |
| 12 | BLOCKS 4 THROUGH 15 | BLOCKS 0 THROUGH 3 |
| 13 | BLOCKS 3 THROUGH 15 | BLOCKS 0 THROUGH 2 |
| 14 | BLOCKS 2 THROUGH 15 | BLOCKS 0 THROUGH 1 |
| 15 | BLOCKS 1 THROUGH 15 | BLOCK 0 |

| RFU 421 | RFU 420 | RFU 419 | RFU 418 | BLOCK PROTECTION CONFIGURATION | |
|---|---|---|---|---|---|
| 0 | 0 | 0 | 0 | | |
| 0 | 0 | 0 | 1 | CONFIGURATION 1 | 331 |
| 0 | 0 | 1 | 0 | CONFIGURATION 2 | 332 |
| 0 | 0 | 1 | 1 | CONFIGURATION 3 | 333 |
| 0 | 1 | 0 | 0 | CONFIGURATION 4 | 334 |
| 0 | 1 | 0 | 1 | CONFIGURATION 5 | 335 |
| 0 | 1 | 1 | 0 | CONFIGURATION 6 | 336 |
| 0 | 1 | 1 | 1 | CONFIGURATION 7 | 337 |
| 1 | 0 | 0 | 0 | CONFIGURATION 8 | 338 |
| 1 | 0 | 0 | 1 | CONFIGURATION 9 | 339 |
| 1 | 0 | 1 | 0 | CONFIGURATION 10 | 340 |
| 1 | 0 | 1 | 1 | CONFIGURATION 11 | 341 |
| 1 | 1 | 0 | 0 | CONFIGURATION 12 | 342 |
| 1 | 1 | 0 | 1 | CONFIGURATION 13 | 343 |
| 1 | 1 | 1 | 0 | CONFIGURATION 14 | 344 |
| 1 | 1 | 1 | 1 | CONFIGURATION 15 | 345 |

| FWH3 417 | FWH2 415 | FWH1 414 | FWH0 413 | BLOCK PROTECTION CONFIGURATION | |
|---|---|---|---|---|---|
| 0 | 0 | 0 | 0 | CONFIGURATION 1 | ⟵ 331 |
| 0 | 0 | 0 | 1 | CONFIGURATION 2 | ⟵ 332 |
| 0 | 0 | 1 | 0 | CONFIGURATION 3 | ⟵ 333 |
| 0 | 0 | 1 | 1 | CONFIGURATION 4 | ⟵ 334 |
| 0 | 1 | 0 | 0 | CONFIGURATION 5 | ⟵ 335 |
| 0 | 1 | 0 | 1 | CONFIGURATION 6 | ⟵ 336 |
| 0 | 1 | 1 | 0 | CONFIGURATION 7 | ⟵ 337 |
| 0 | 1 | 1 | 1 | CONFIGURATION 8 | ⟵ 338 |
| 1 | 0 | 0 | 0 | CONFIGURATION 9 | ⟵ 339 |
| 1 | 0 | 0 | 1 | CONFIGURATION 10 | ⟵ 340 |
| 1 | 0 | 1 | 0 | CONFIGURATION 11 | ⟵ 341 |
| 1 | 0 | 1 | 1 | CONFIGURATION 12 | ⟵ 342 |
| 1 | 1 | 0 | 0 | CONFIGURATION 13 | ⟵ 343 |
| 1 | 1 | 0 | 1 | CONFIGURATION 14 | ⟵ 344 |
| 1 | 1 | 1 | 0 | CONFIGURATION 15 | ⟵ 345 |

FIG. 6

FIRMWARE MEMORY HAVING MULTIPLE PROTECTED BLOCKS

FIELD OF THE INVENTION

This invention relates to the field of memory devices and, more specifically, to protection of data stored within memory devices.

BACKGROUND

A motherboard is the main circuit board inside a computer system that connects directly or indirectly to every part of the computer system. The motherboard contains processors, memories, control chipsets and various buses used to link the motherboard components with various hardware devices such as a display, a drive, a keyboard, etc.

In order for a computer system to function, the computer's operating system needs to be configured to communicate with the computer system's devices. A Basic Input Output System (BIOS) is used for this configuration. The BIOS resides in a non-volatile memory device, such as a flash memory, hereinafter referred to as a BIOS memory. The BIOS includes low-level code, referred to as boot code, that enables communication between the computer's operating system and hardware devices. The boot code provides the initial instructions for power on self-test (POST) and booting system files. When a computer system is powered on, the boot code is fetched from BIOS memory and placed into a random access memory (RAM) for execution (although some boot code may be executed directly from the BIOS memory). The boot code is executed, for example, to load the operating system into the system's processor.

The BIOS memory is typically tested by memory manufacturers to verify compliance with specifications before shipment to a motherboard manufacturer. The motherboard manufacturer, such as an original equipment manufacturer (OEM), then programs the code into the BIOS memory. The BIOS memory can then be configured for its regular operation. As such, a BIOS memory may have different interfaces for each of these modes, for example, a programming mode and an operation mode. The particular mode is selected prior to power-up or before return from reset. The programming mode may be used as a programming interface for OEMs to use during motherboard manufacturing or component pre-programming. The programming interface is generally not intended for use during regular computer operations. The operation interface is used to operate with the control chipsets during platform operations.

Figure 1:
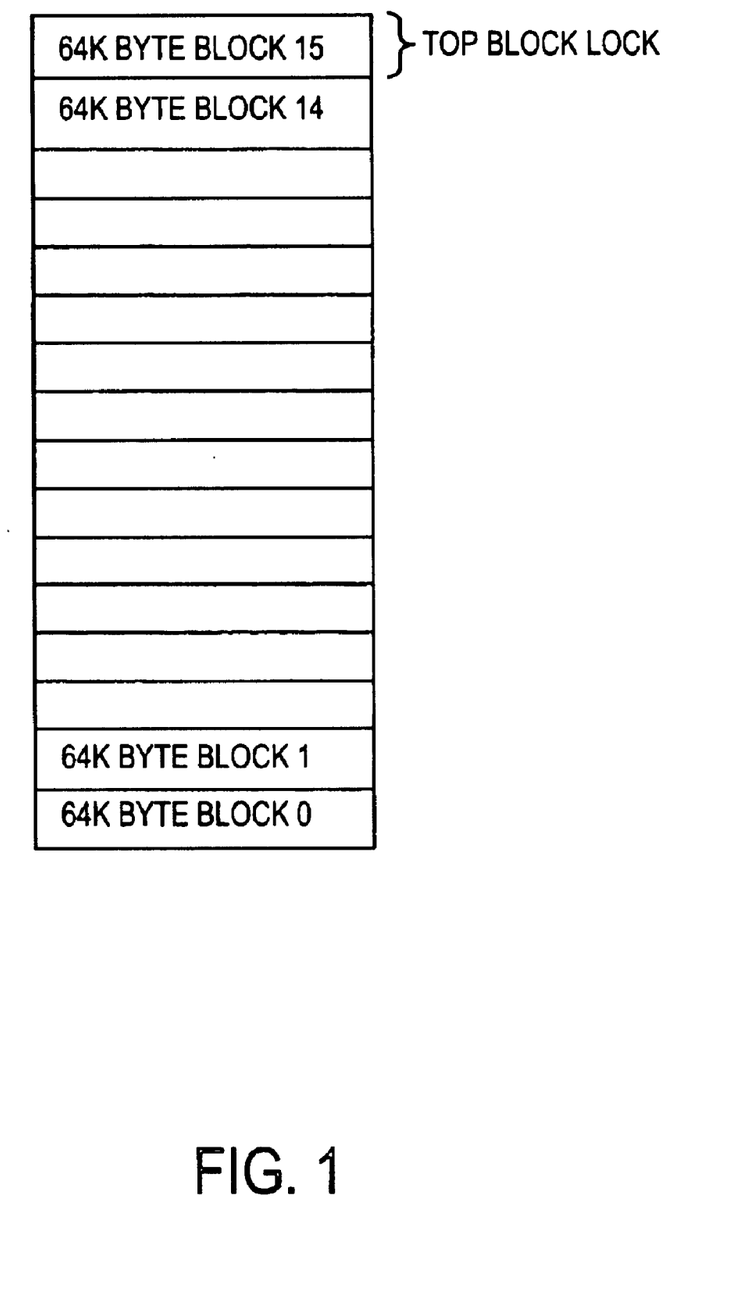
FIG. 1 illustrates a prior art single, top block locking scheme.

The use of different interfaces allows for security and manageability features, while also allowing for the component to be tested and programmed quickly with automated test equipment (ATE) and memory programmers in the OEM's manufacturing flow. One of the security features is the ability to protect certain sections, or blocks, of the BIOS memory from accidental or intentional corruption during such a process. A BIOS memory may come in different sizes, for example, 8 Megabits (Mb, also referred to as 1 Megabyte (MB)) and 4 Mb (½ MB). Each BIOS memory has a set of contiguous blocks. Typically block granularity may be 65536 bytes (64 KB). As such, on an 8 Mb BOIS BIOS memory, there may be 16 blocks as illustrated in FIG. 1.

Prior BIOS memories use the top most block (e.g., block 15 of an 8 Mb) to store critical code, such as the boot code. Access to the boot code stored in the top most block may be controlled by a top block lock (TBL) input. The TBL input is configured to receive a signal that when held low (active) prevents program or block erase operations in the top most block. BIOS memories may also include a write protect (WP) input that serves the same function as TBL for the remaining blocks: all blocks except the top block. The WP input operates independently from the TBL input and does not affect the lock status of the top block.

Currently, the TBL input of a BIOS memory provides protection only on the top most (e.g., 64 Kbyte size) block of the BIOS. Due to boot code sizes growing greater than block granularity, the top block lock feature of prior BIOS memories may not meet newer security requirements.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific, components, circuits, processes, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

Figure 2A:
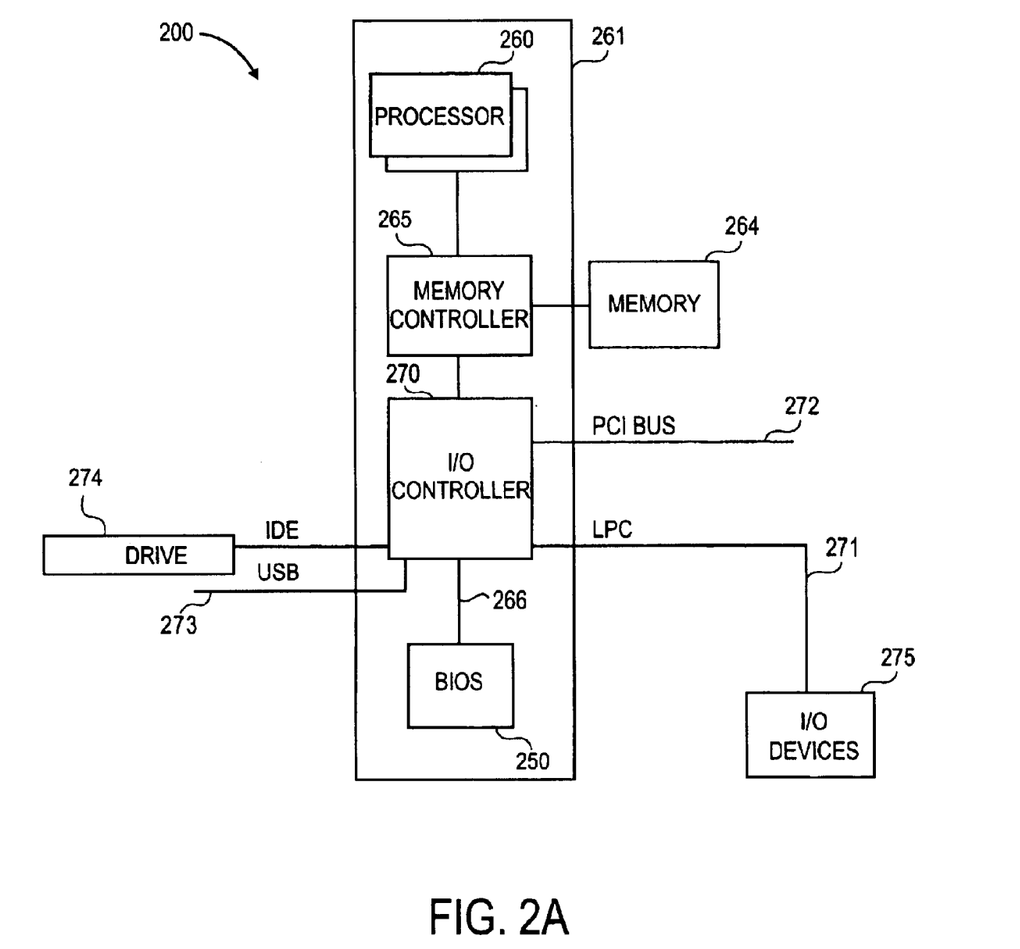
FIG. 2A illustrates one embodiment of a computer system containing a memory component having multiple block locking.

FIG. 2A illustrates one embodiment of a computer system containing a memory component having multiple block locking. Computer system 200 may be, for example, a personal computer system. Computer system 200 may include one or more processors (e.g., processor 260), a memory controller 265, an input/output (I/O) controller 270, and one or more BIOS memories (e.g., BIOS memory 250). In one embodiment, processor 260, memory controller 265, I/O controller 270 and BIOS memory 250 may reside on a motherboard 261. In an alternative embodiment, one or more of processor 260, memory controller 265, I/O controller 270 and BIOS memory 250 may reside on other types of component boards, for example, a daughter board.

The memory controller 265 controls operations between processor 260 and a memory device 264, for example, a random access memory (RAM). The I/O controller 270 may control operations between processor 260 and one or more input/output (I/O) devices 275, for examples, a keyboard and a mouse over a low pin count (LPC) bus 271. The I/O controller 270 may also control operations between processor 260 and peripheral devices, for example, a drive 274. Additional buses may also be coupled to I/O controller 270 for controlling other devices, for examples, a peripheral component interconnect (PCI) bus 272 and a universal serial bus (USB) 273. In one embodiment, the memory controller 265 and the I/O controller 270 may be integrated into a single component.

BIOS memory 250 may be coupled to I/O controller 270 via bus 266. BIOS memory 250 is a non-volatile programmable memory, for example, a flash memory that retains the contents of data stored within it even after power is no longer supplied. Alternatively, BIOS memory 250 may be other types of programmable memory devices, for examples, a programmable read only memory (PROM) and an erasable programmable read only memory (EPROM). In one embodiment, BIOS memory 250 may be similar to an 82802 firmware hub (FWH) manufactured by Intel Corp., of Santa Clara, Calif. that is modified to provide locking of multiple boot blocks as discussed herein. Computer system 200 may also include other BIOS memories in addition to BIOS memory 250.

When the computer system 200 powers on, boot code is fetched from BIOS memory 250 and placed, in whole or in part, into memory device 264. As such, boot code may be executed either from memory device 264 or directly from BIOS memory 250. System booting is known in the art; accordingly, a detailed discussion is not provided.

Although illustrated with a conventional personal computer system, BIOS memory 250 is not so limited in use. In an alternative embodiment, BIOS memory 250 may be used in other types of data processing systems, for examples, personal digital assistants (PDA), laptop computers, workstations, wireless phones, network hubs and switches.

BIOS memory 250 may be partitioned into multiple blocks and configured to enable two or more of the multiple blocks to operate as boot blocks storing boot code. Boot code may include code that provides the initial instructions for power on self-test and booting of computer system 200. The boot code may also include recovery code to restore computer system 200 from firmware corruption. In one embodiment, for example, a boot block group may include processor abstraction layer (PAL) code, system abstraction layer (SAL) code and recovery code. The PAL includes code for determining whether one or more processors in computer system 200 are ready for operation. The SAL includes code for determining whether to initiate a recovery. The recovery code includes code for interpreting the file systems and drivers for accessing hardware devices. The different codes may exist as separate components in the boot block group and may be written in different languages. In one embodiment, for example, SAL may be written in assembly language and the recovery code may be written in C. In an alternative embodiment, the boot code may only include recovery code without PAL and SAL code. In yet another embodiment, the boot code may only include the minimum code necessary to initialize computer system 200 such as routines for power on self tests (POST) and/or routines to enable certain low level interactions with devices such as a display.

The combined size of each of the boot code components may be greater than the size of a single boot block. For example, a block size may be 64 KB while the combined size of all the boot code may be 320 KB. A 320 KB boot code cannot fit within a single 64 KB boot block. In such a situation, a multiple block boot group may be used to store the boot code, as discussed below in relation to FIG. 3A.

Figure 2B:
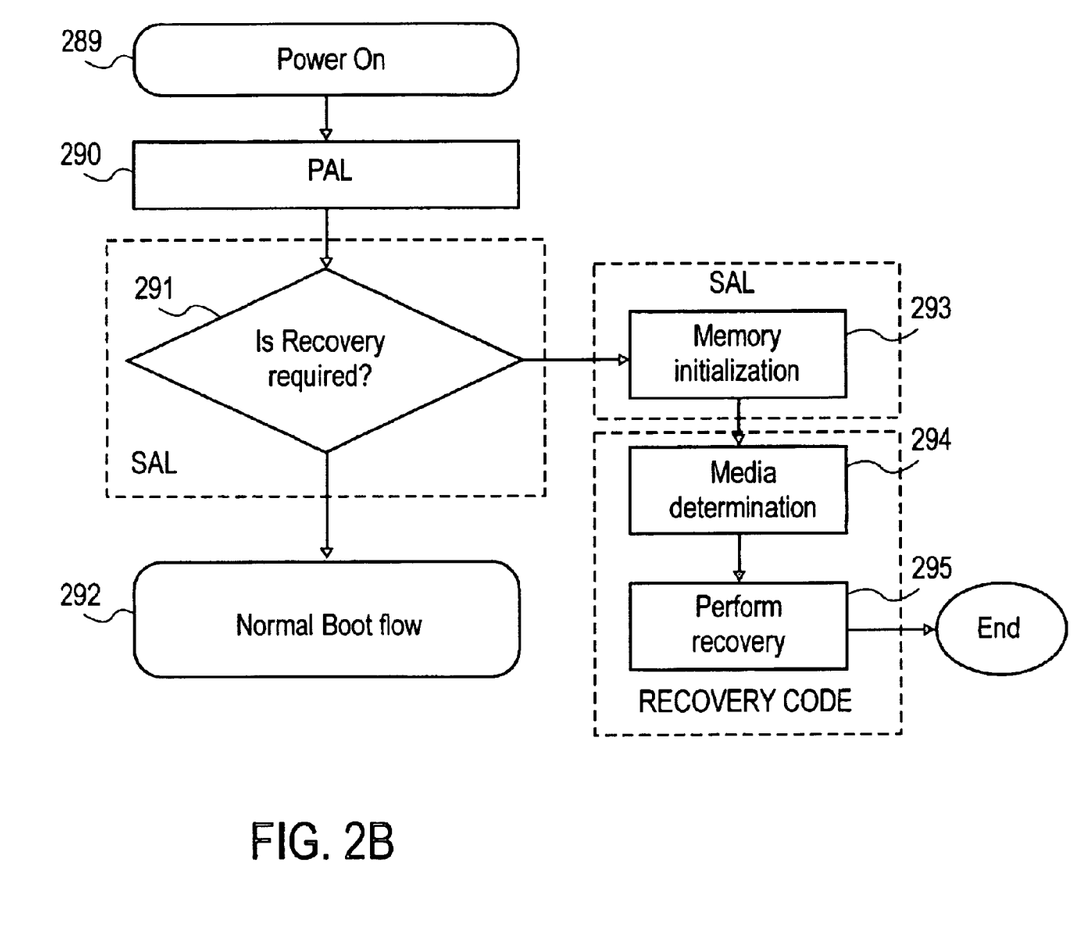
FIG. 2B illustrates one embodiment of a boot flow for a computer system.

FIG. 2B illustrates one embodiment of a boot flow for a computer system. After power on, step 289, of computer system 200, step 290, a decision on whether to enter a recovery mode is made. In one embodiment, a processor abstraction layer (PAL) may first be used to determine if one or more processors in computer system 200 are ready for operation. PAL code may be retrieved from BIOS memory 250 and executed, step 290. The PAL detects any errors with the processors and communicates this information with the SAL. The SAL uses the processor error information to make a recovery decision. A recovery may be required, for example, if firmware within a processor is determined to be corrupted. In one embodiment, a recovery may be forced, for example, through the use of a manual jumper. If recovery is not determined to be necessary, then computer system 200 may proceed with a normal boot flow, step 292.

If a recovery is deemed necessary, then the SAL may initialize the memory 264 with the recovery code, step 293. The recovery code includes code for interpreting the file systems and drivers for accessing hardware devices; such as removable media (e.g., drive 274). A media determination is performed using the recovery code, step 294, and then a recovery is performed, step 295. If the size of the abstraction layers and the recovery code is greater than a single block size, multiple blocks may be used to store the boot code. In this manner, computer system architectures may use a boot block group to store abstraction layer code and/or recovery code in excess of single block sizes. For example, BIOS memory 250 may have a block size of 64K. If, for example, the PAL code size is 40K, the SAL code size is 97K, and the recovery code size is 120K (for a total of 257K boot code), then five blocks may be used to store the boot code.

Figure 3A:
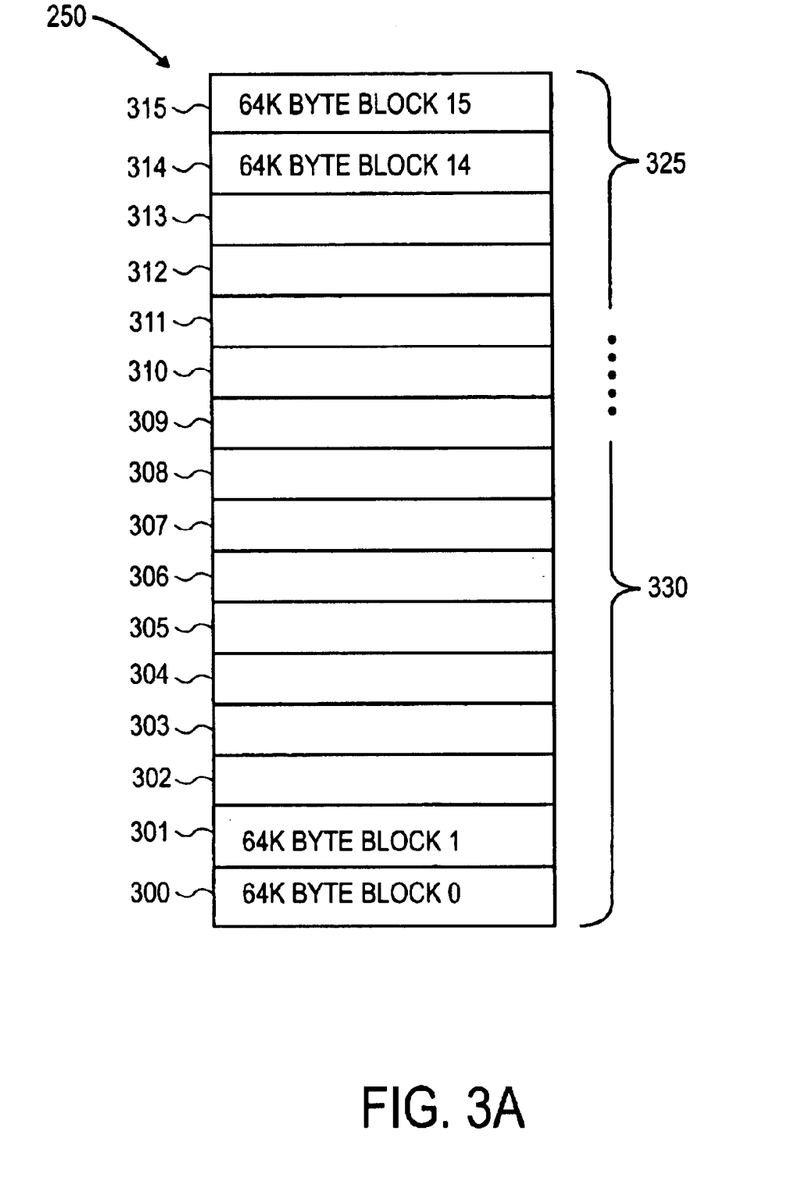
FIG. 3A illustrates one embodiment of a BIOS memory having a multiple block lock architecture.

FIG. 3A illustrates one embodiment of a BIOS memory having a multiple block lock architecture. In one embodiment, for example, BIOS memory 250 may be 8 Mb BOIS memory having 16 blocks (blocks 300–315), with each of blocks 300–315 being 64 KB in size. The methods discussed herein are not limited to only 64 KB block, 8 Mb BIOS memories and may be applied to BIOS memories having other numbers of blocks and block sizes. Two or more of blocks 300–315 may be used to store boot code based on the boot code size. For example, if the boot code size is 320 KB, then the boot code may be stored in, and retrieved from, a boot blocks group 325 (e.g., blocks 315–311). The remaining blocks 330 may be used to store, for examples, BIOS configuration logic, code for peripheral enumeration and initializations, option ROM execution, establishing interrupt tables, etc. The boot blocks may be transparent to the other components of computer system 200 such that the components consider the multiple block span to operate similar to a top block of prior architectures. In an alternative embodiment, the blocks that make up boot blocks group 325 may be non-contiguous rather than the contiguous structure illustrated in the FIG. 3A. Various multi-block configurations may be selected using two or more inputs (e.g., a block lock input and write protect input), as illustrated in FIG. 3B.

Figure 3B:
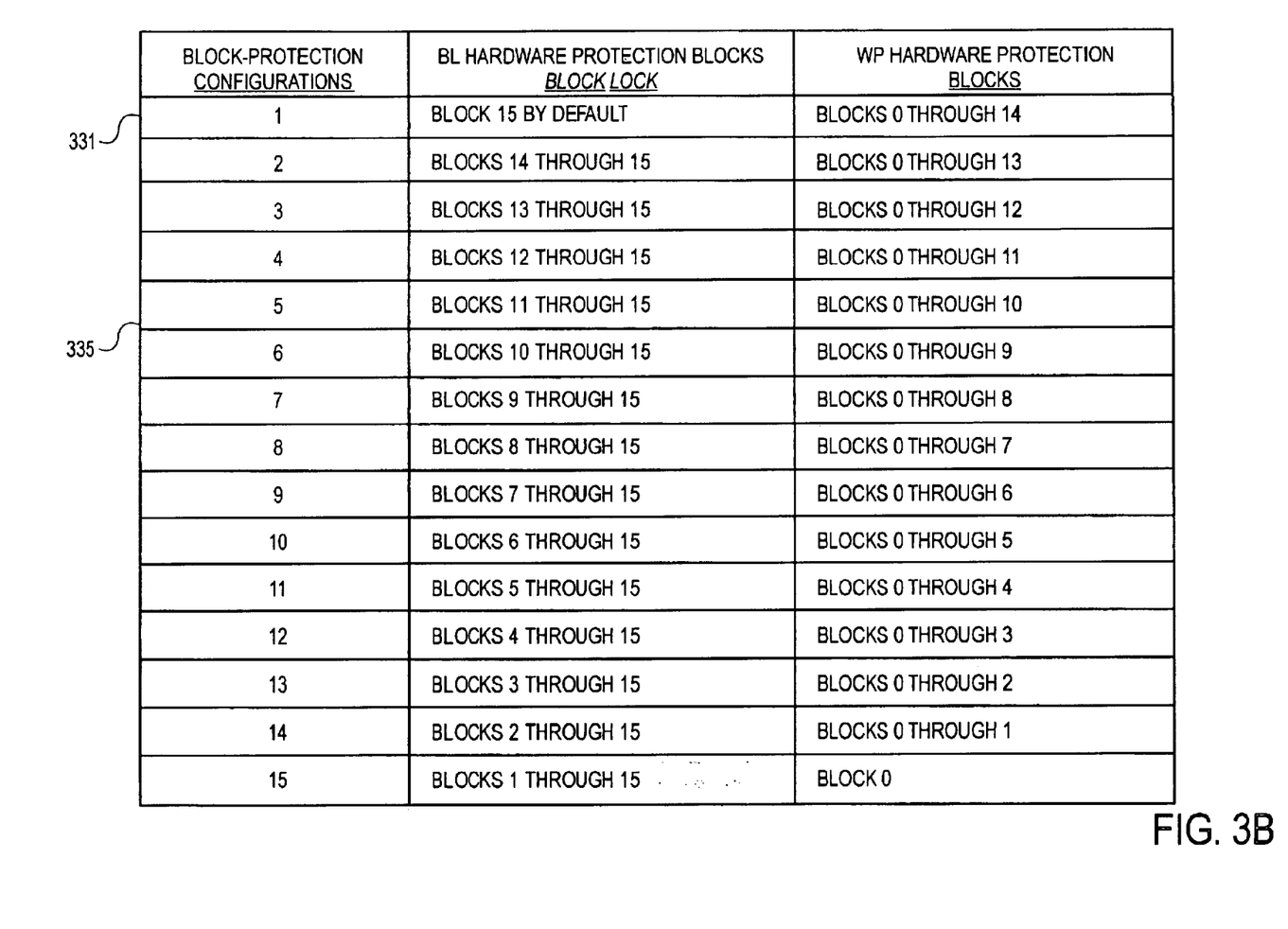
FIG. 3B illustrates a block protection configuration for a 16 block BIOS memory.

FIG. 3B illustrates a block protection configuration for a 16 block BIOS memory. For example, a first configuration 331 may be a default configuration where the top most block (block 15) is the boot block and blocks 0 through 14 are free for other data storage. For another example, in a fifth block configuration 333, blocks 11 through 15 are designated as boot blocks. The multi block group 325 for a particular configuration may be accessed through the use of one or more inputs of memory device 350, as illustrated below in FIG. 4.

Figure 4:
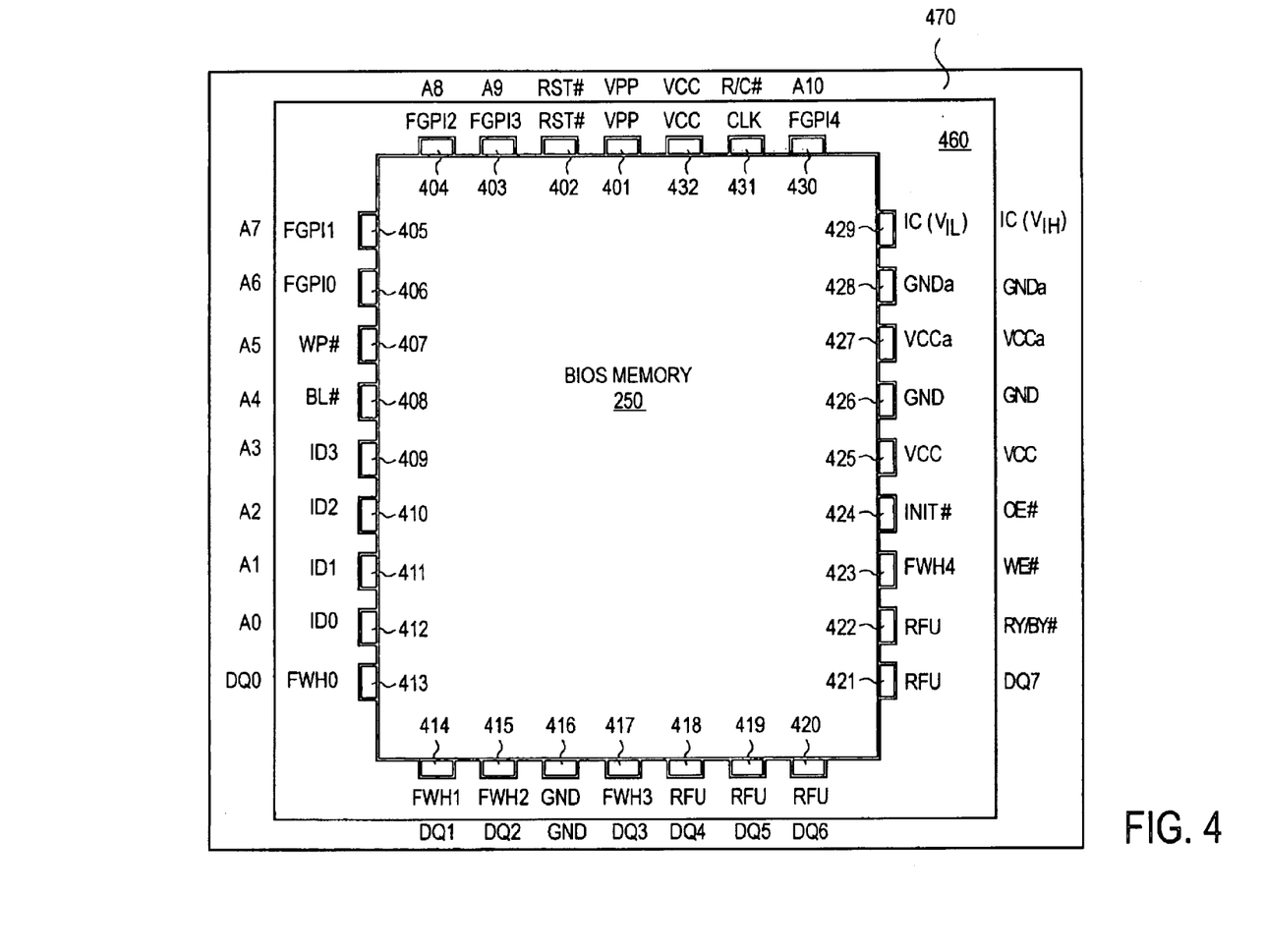
FIG. 4 illustrates one embodiment of a BIOS memory having two interfaces.

FIG. 4 illustrates one embodiment of a BIOS memory having two interfaces. Although illustrated with I/Os 401–432, BIOS memory 250 may have more or less than 32 I/Os. In one embodiment, BIOS memory 250 includes two or more interfaces, for example, a programming interface 470 and an operation interface 460. In an alternative embodiment, BIOS memory 250 may have less or more than two interfaces. For example, BIOS memory 250 may have a testing interface for use at wafer level testing. As such, an "input" as used herein may be accessed through a packaged pin or directly through a die pad.

Where two interfaces are used, a particular interface may be selected by toggling a voltage state on an interface configuration (IC) input 429. While one interface is in use, the other component interfaces are disabled. As such, IC input 429 provides control between interfaces 470 and 460. In one embodiment, for example, IC input 429 may be held low or floated to enable the operation interface 460 and held high to enable programming interface 460. The particular interface mode is selected prior to power-up or before a return from reset, for example, when a reset (RST) input 402 is transitioned from a low state to a high state. When RST input 402 is driven low, write operations to BIOS memory 250 are inhibited to provide data protection during power transitions, resets internal automation, and may tri-state certain inputs. When RST input 402 is driven high, normal operations are enabled. Alternatively, other voltage configurations on IC input 429 and RST input 402 may be used to select between interfaces 410 and 460 and reset BIOS memory 250, respectively.

BIOS memory 250 also includes a block lock (BL) input 408 and a write protect (WP) input 407. The BL input 408 may be used to prevent program or block erase operations in multiple boot blocks that are selected based on the state applied to BL input 408. For example, when BL input 408 is driven to a low state, the particular number of selected boot blocks is protected when RST is driven low. In one embodiment, for example, the state of the BL input 408 may be controlled via a jumper. WP input 407 serves the same function as BL input 408 for the remaining blocks. In one embodiment, the state of the WP input 407 may be controller via a pull-up resistor by default. In embodiments where the protection state is sampled at the beginning of an operation, the BL and WP inputs 408 and 407, respectively, are set to the desired protection configuration prior to starting a program or erase operation.

The number of boot blocks selected for locking (the protection configuration), may be set in either of the interfaces: programming interface 470 or operation interface 460. The particular protection configuration may be set using a plurality of protection configuration inputs of BIOS memory 250.

Figure 5:
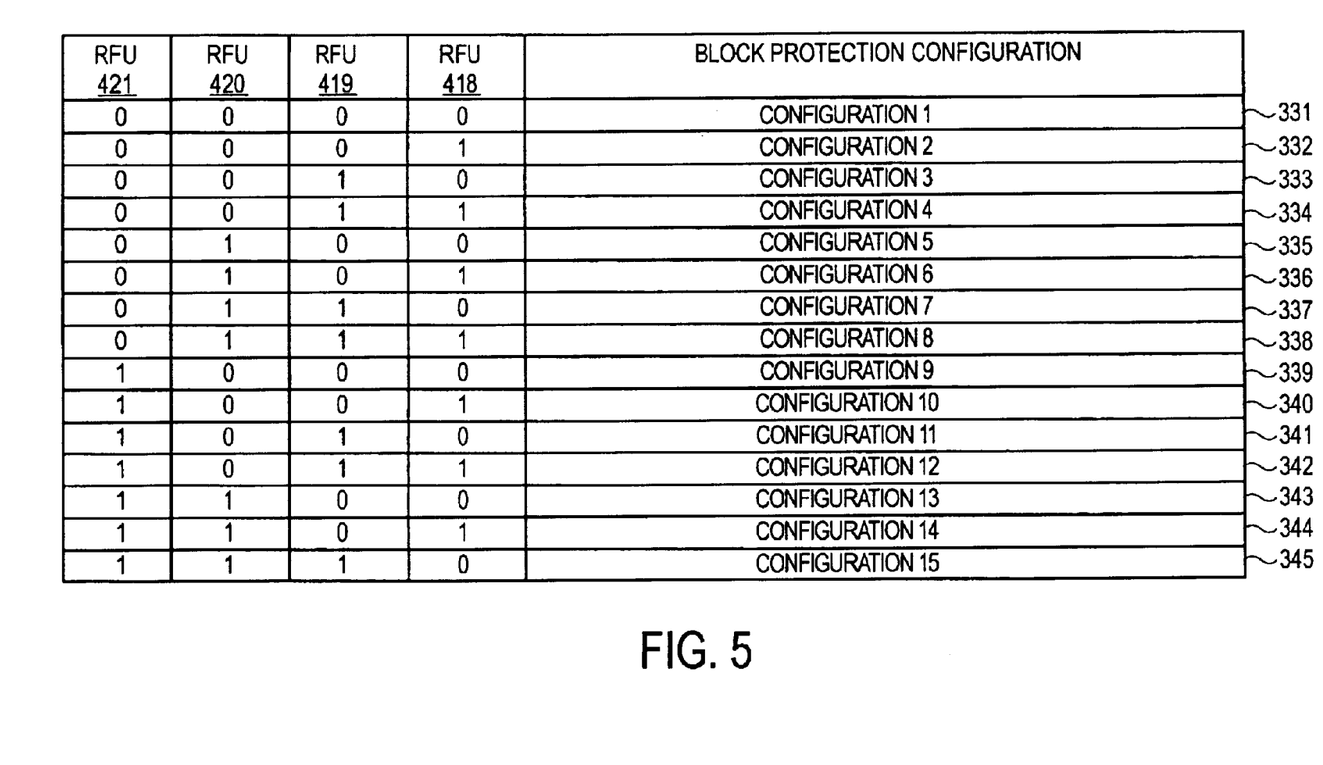
FIG. 5 illustrates one embodiment of setting a protection configuration.

FIG. 5 illustrates one embodiment of setting a protection configuration. In one embodiment, for example, the protection configuration inputs may be designed into reserved for future use (RFU) inputs 418 to 421 of a BIOS memory device. RFU inputs may have no function on older generation of the BIOS memory device and are reserved for functions on future generations of a product. In alternative embodiments, other inputs of BIOS memory 250 may be used to set the protection configuration. The operation mode 460 may be selected, for example, by driving IC input 429 low and then protection inputs 418 to 421 may be read (e.g., when RST input 402 is driven low) to determine the protection configuration.

By applying different voltage states to the protection configuration inputs 418 to 421, one of protection configurations 331 to 345 may be selected. For example, if the voltage states 0, 1, 0, 0 are applied to protection configuration inputs 421, 420, 419, and 418, respectively, then "configuration 5" 335, corresponding to locking blocks 11 through 15 of FIG. 3B, is selected. In an alternative embodiment, other voltage states and combinations may be used to select each protection configuration.

Figure 6:
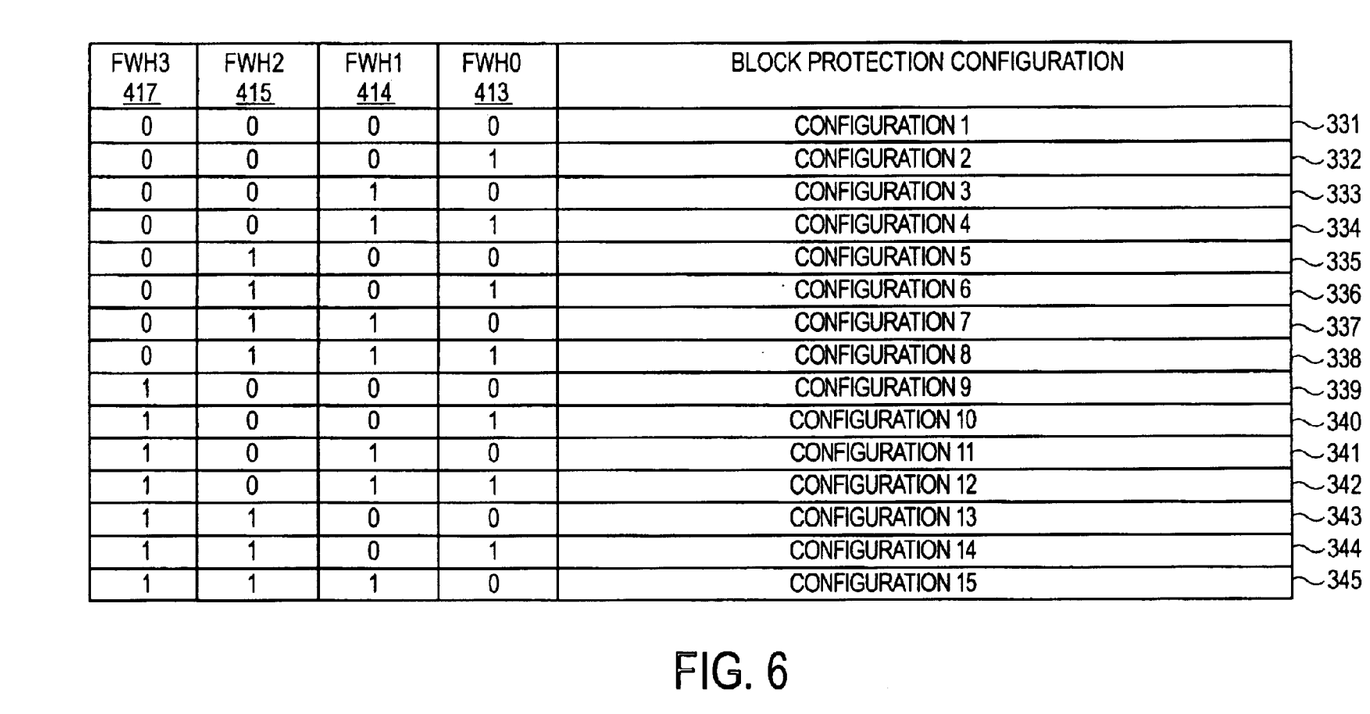
FIG. 6 illustrates an alternative embodiment of setting a protection configuration.

Alternatively, the particular protection configuration may set using inputs in programming mode 470, as illustrated in FIG. 6. A different set of inputs may be used in programming mode 470 than operation mode 460 to select the particular protection configuration. For example, where inputs 418–421 are already designated for a use in programming interface 470, inputs 413, 414, 415, and 417 may be used to select the particular protection configuration. Inputs 413, 414, 415, and 417 may be data inputs used to transfer firmware into BIOS memory 250. In alternative embodiments, other inputs of a BIOS memory may be used to set the protection configuration. The programming interface 470 may be selected, for example, by driving IC input 429 high. Protection inputs 413, 414, 415, and 417 are then read (e.g., when RST input 402 is driven low) to determine the protection configuration.

By applying different voltage states to the protection configuration inputs 413, 414, 415, and 417, one of protection configurations 331 to 345 may be selected. For example, if the voltage states 0, 1, 0, 0 are applied to protection configuration inputs 417, 415, 414, and 413, respectively, then "configuration 5" 335, corresponding to locking blocks 11 through 15 of FIG. 3B, is selected.

In one embodiment, BIOS memory 250 may include block-locking registers (not shown) coupled to corresponding memory blocks. In such an embodiment, the status of BL and WP may not affect the status of block-locking registers. BL and WL inputs 408 and 407 when active, write-protect the appropriate blocks regardless of the associated block locking registers. For example, when protection configuration 335 is selected, writing to blocks 11–15 of BIOS memory 250 is prevented, regardless of the state of write block bits in the block locking registers. In such a case, clearing the write-protect bit in a register will have no functional effect, even though the register may indicate that the block is no longer locked.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarding in an illustrative sense rather than a restrictive sense.

What is claimed is:

1. An apparatus, comprising:

means for selecting two or more memory blocks from among a plurality of memory blocks, the two or more memory blocks to store a boot code, wherein the boot code has a first size being greater than a second size of one of the two or more memory blocks;

means for hardware locking the two or more memory blocks; and means for storing the boot code in the two or more memory blocks, wherein the plurality of memory blocks is contained within a BIOS memory device having a programming interface and an operation interface and wherein the means for selecting further comprises means for selecting the two or more memory blocks in either of the programming interface and the operation interface.

2. The apparatus of claim 1, wherein the plurality of memory blocks is contained within a BIOS flash memory device.

3. A memory, comprising:

a plurality of memory blocks, two or more memory blocks of the plurality of memory blocks to a store boot code, wherein the boot code has a first size being greater than a second size of one of the two or more memory blocks;

a boot lock input to lock the two or more memory blocks;

an interface configuration input to select between a first interface and a second interface;

a first plurality of configuration inputs to select the two or more memory blocks from among the plurality of memory blocks in the first interface; and a second plurality of configuration inputs to select the two or more memory blocks from among the plurality of memory blocks in the second interface.

4. A memory, comprising:

a plurality of memory blocks, two or more memory blocks of the plurality of memory blocks to a store boot code, wherein the boot code has a first size being greater than a second size of one of the two or more memory blocks;

a boot lock input to lock the two or more memory blocks;

an interface configuration input to select between a programming interface and an operation interface;

a first plurality of configuration inputs to select the two or more memory blocks from among the plurality of memory blocks in the programming interface; and a second plurality of configuration inputs to select the two or more memory blocks from among the plurality of memory blocks in the operation interface.

5. An apparatus, comprising:

an input/output controller; and a BIOS memory coupled to the input/output controller, the BIOS memory comprising a plurality of memory blocks, two or more memory blocks of the plurality of memory blocks to store a boot code, wherein the boot code has a first size being greater than a second size of one of the two or more memory blocks, wherein the BIOS memory further comprises:

a boot lock input to lock the two or more memory blocks;

an interface configuration input to select between a programming interface and an operation interface;

a first plurality of configuration inputs to select the two or more memory blocks from among the plurality of memory blocks in the programming interface; and a second plurality of configuration inputs to select the two or more memory blocks from among the plurality of memory blocks in the operation interface.

6. The memory of claim 3, wherein the memory is a BIOS flash memory.

7. The memory of claim 3, wherein one of the two or more blocks is a top most block.

8. The memory of claim 3, wherein the two or more blocks are contiguous blocks of the plurality of memory blocks.

9. The apparatus of claim 5, wherein the BIOS memory is a flash memory.

10. The apparatus of claim 5, wherein one of the two or more blocks is a top most block.

11. The apparatus of claim 5, wherein the two or more blocks are contiguous blocks of the plurality of memory blocks.

* * * * *

UNITED STATES PATENT AND TRADEMARK OFFICE
CERTIFICATE OF CORRECTION

PATENT NO. : 6,772,307 B1
DATED : August 3, 2004
INVENTOR(S) : Nguyen et al.

It is certified that error appears in the above-identified patent and that said Letters Patent is hereby corrected as shown below:

Column 4,
Line 20, after "devices", delete ";" and insert -- , --.

Column 6,
Line 51, delete "regarding" and insert -- regarded --.

Signed and Sealed this

Twelfth Day of October, 2004

JON W. DUDAS
*Director of the United States Patent and Trademark Office*